(12) United States Patent
Sugitani et al.

(10) Patent No.: US 9,399,455 B2
(45) Date of Patent: Jul. 26, 2016

(54) DEVICE FOR CONTROLLING DISTRIBUTION FORCE IN A FOUR-WHEEL DRIVE VEHICLE

(71) Applicant: Nissan Motor Co., Ltd., Yokohama-shi, Kanagawa (JP)

(72) Inventors: Osamu Sugitani, Tama (JP); Toshiharu Takasaki, Sagamihara (JP); Kotaro Tanaka, Fujisawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 14/647,202

(22) PCT Filed: Nov. 20, 2013

(86) PCT No.: PCT/JP2013/081305
§ 371 (c)(1),
(2) Date: May 26, 2015

(87) PCT Pub. No.: WO2014/091896
PCT Pub. Date: Jun. 19, 2014

(65) Prior Publication Data
US 2015/0298679 A1    Oct. 22, 2015

(30) Foreign Application Priority Data

Dec. 11, 2012 (JP) .................................. 2012-270182

(51) Int. Cl.
*B60L 9/00* (2006.01)
*B60L 11/00* (2006.01)
(Continued)

(52) U.S. Cl.
CPC ................ *B60W 10/119* (2013.01); *B60K 6/48* (2013.01); *B60K 6/52* (2013.01); *B60K 23/0808* (2013.01);
(Continued)

(58) Field of Classification Search
CPC ........ B60K 23/0808; B60K 6/48; B60K 6/52; B60L 11/14; B60L 15/2054; B60L 2240/423; B60L 2240/463; B60L 2260/28; B60L 2260/42; B60W 10/02; B60W 10/08; B60W 10/11; B60W 10/119; B60W 20/00; B60W 20/10; B60W 2510/1005; B60W 2710/1022; B60W 2720/403; B60W 30/1882; Y02T 10/6221; Y02T 10/6265; Y02T 10/645; Y02T 10/70; Y02T 10/7077; Y02T 10/72; Y02T 10/7275; Y10S 903/916
USPC ........... 701/22, 36, 51, 54, 61, 67, 69, 70, 72, 701/84, 87, 88, 89; 180/243, 245, 65.1, 180/65.21, 65.265, 65.275
See application file for complete search history.

(56) References Cited

U.S. PATENT DOCUMENTS 5,988,307 A * 11/1999 Yamada .................... B60K 6/26
                                                                180/243
6,615,940 B2 * 9/2003 Morisawa ................ B60K 6/46
                                                                180/165

(Continued)

FOREIGN PATENT DOCUMENTS

JP          2000-335272 A    12/2000

*Primary Examiner* — Khoi Tran
*Assistant Examiner* — Jorge Peche
(74) *Attorney, Agent, or Firm* — Global IP Counselors, LLP

(57) ABSTRACT

A device for controlling the distribution of drive force includes a driven wheel drive force distribution reference command value calculator configured to determine a driven-wheel-oriented drive force distribution reference command value from the estimated value of the drive force sent to the drive wheels and a drive force reference distribution ratio, and a driven wheel drive force distribution command value calculator configured to determine a driven-wheel-oriented drive force distribution command value by correcting the driven wheel drive force distribution reference command value by a correction amount that differs between the electric motor operating mode and the electric motor non-operating mode, and to make the correction amount for the electric motor operating mode greater than the correction amount for the electric motor non-operating mode.

4 Claims, 4 Drawing Sheets

(51) Int. Cl.

| | | |
|---|---|---|
| *B60W 10/119* | (2012.01) | |
| *B60K 6/48* | (2007.10) | |
| *B60K 6/52* | (2007.10) | |
| *B60L 11/14* | (2006.01) | |
| *B60L 15/20* | (2006.01) | |
| *B60W 20/00* | (2016.01) | |
| *B60K 23/08* | (2006.01) | |
| *B60W 10/11* | (2012.01) | |
| *B60W 30/188* | (2012.01) | |
| *B60W 10/02* | (2006.01) | |
| *B60W 10/08* | (2006.01) | |

(52) U.S. Cl.
CPC ............ *B60L 11/14* (2013.01); *B60L 15/2054* (2013.01); *B60W 10/02* (2013.01); *B60W 10/08* (2013.01); *B60W 10/11* (2013.01); *B60W 20/00* (2013.01); *B60W 20/10* (2013.01); *B60W 30/1882* (2013.01); *B60L 2240/423* (2013.01); *B60L 2240/463* (2013.01); *B60L 2260/28* (2013.01); *B60L 2260/42* (2013.01); *B60W 2510/1005* (2013.01); *B60W 2710/1022* (2013.01); *B60W 2720/403* (2013.01); *Y02T 10/6221* (2013.01); *Y02T 10/6265* (2013.01); *Y02T 10/645* (2013.01); *Y02T 10/70* (2013.01); *Y02T 10/7077* (2013.01); *Y02T 10/72* (2013.01); *Y02T 10/7275* (2013.01); *Y10S 903/916* (2013.01); *Y10S 903/93* (2013.01)

(56) References Cited

U.S. PATENT DOCUMENTS

| | | | | |
|---|---|---|---|---|
| 2001/0025219 A1* | 9/2001 | Ohba | ..................... | B60K 6/365 701/89 |
| 2002/0030408 A1* | 3/2002 | Niwa | ..................... | B60K 6/44 303/152 |
| 2002/0036429 A1* | 3/2002 | Shimada | .................. | B60K 6/44 303/152 |
| 2002/0180266 A1* | 12/2002 | Hara | ..................... | B60L 7/18 303/152 |
| 2003/0080614 A1* | 5/2003 | Soga | ..................... | B60K 6/44 303/152 |
| 2004/0040760 A1* | 3/2004 | Kadota | ..................... | B60K 6/44 180/65.225 |
| 2004/0092363 A1* | 5/2004 | Maekawa | ............ | B60K 23/0808 477/74 |
| 2004/0163860 A1* | 8/2004 | Matsuzaki | ............ | B60K 6/44 180/65.225 |
| 2005/0150702 A1* | 7/2005 | Matsuzaki | ............ | B60K 6/52 180/197 |
| 2006/0100057 A1* | 5/2006 | Severinsky | ........... | B60H 1/004 477/4 |
| 2006/0138995 A1* | 6/2006 | Sugita | ..................... | B60K 6/44 318/811 |
| 2007/0000707 A1* | 1/2007 | Porter | ..................... | B60K 6/26 180/243 |
| 2007/0267233 A1* | 11/2007 | Wenthen | ................. | B60K 6/365 180/243 |
| 2009/0076696 A1* | 3/2009 | Perkins | .................. | B60K 23/08 701/69 |
| 2009/0088919 A1* | 4/2009 | Muta | ..................... | B60K 6/44 701/69 |
| 2012/0203416 A1* | 8/2012 | Yoshimura | ............. | B60K 6/445 701/22 |
| 2013/0297162 A1* | 11/2013 | Dai | ..................... | B60W 20/30 701/55 |
| 2014/0296028 A1* | 10/2014 | Joeng | ..................... | B60W 10/08 477/9 |
| 2015/0166048 A1* | 6/2015 | Herrmann | ............ | B60W 20/40 701/22 |

\* cited by examiner

DEVICE FOR CONTROLLING DISTRIBUTION FORCE IN A FOUR-WHEEL DRIVE VEHICLE

CROSS-REFERENCE TO RELATED APPLICATIONS

This application is a U.S. National stage application of International Application No. PCT/JP2013/081305, filed Nov. 20, 2013, which claims priority to JP Patent Application No. 2012-270182 filed on Dec. 11, 2012, the contents of each of which are hereby incorporated herein by reference.

BACKGROUND

1. Field of the Invention

The present invention relates to a device for controlling the distribution of drive force in a hybrid four-wheel drive vehicle, the device comprising an engine and an electric motor as motive power sources, and having an electric travel mode (EV mode) that relies only on the electric motor, an electric motor operating mode in the manner of a hybrid travel mode (HEV mode) that relies on the engine and the electric motor, and an electric motor non-operating mode which is like a conventional travel mode (CONV mode) that relies only on the engine.

2. Background Information

The device disclosed in Japanese Laid-Open Patent Application No. 2000-335272, for example, is conventionally known as a device for controlling the distribution of drive force in a four-wheel drive vehicle.

This proposed technology is a device for controlling the distribution of drive force not for a hybrid four-wheel drive vehicle, but for a common four-wheel drive vehicle equipped only with an engine as a drive source, and is designed so that of the drive force sent from the engine to the main drive wheels, a drive force amount equivalent to a drive force distribution command value established according to an estimated value of the drive force sent to the main drive wheels is directed to driven wheels by a 4WD clutch of which the engagement capacity is controlled so that the drive force amount equivalent to the drive force distribution command value can be transmitted.

SUMMARY

When the above-described drive force distribution control device for a common four-wheel drive vehicle is used to control the drive force distribution of a hybrid four-wheel drive vehicle, problems such as the following have been confirmed to occur.

Specifically, when determining a distribution command value of the drive force to be sent to the driven wheels during four-wheel drive, the source drive force being sent to the main drive wheels must be estimated, and the drive force (output torque) of the motive power sources must therefore be estimated.

However, a hybrid four-wheel drive vehicle is equipped with an electric motor in addition to an engine as a drive source, and in an electric motor operating mode such as EV mode or HEV mode, an estimation of the electric motor output torque is indispensable, while in an electric motor non-operating mode such as CONV mode, an estimation of the electric motor output torque is conversely not necessary, and only the engine output torque need be estimated.

Estimating the electric motor output torque has greater response and greater precision than estimating the engine output torque, and the estimated value of the electric motor output torque (drive force) is therefore more accurate, both steadily and temporarily, than the estimated value of the engine output torque (drive force).

Consequently, in the electric motor non-operating mode which relies only on the engine, the estimated value of the motive power source output torque (the drive force of the main drive wheels) is raised by a safety margin to compensate for four-wheel drive performance, and it is normal for a command value for the distribution of drive force to the driven wheels to be resin by the same cost as a result.

Therefore, in the electric motor operating mode and the electric motor non-operating mode of a hybrid four-wheel drive vehicle, the resulting four-wheel drive performance differs even under the same conditions, creating a disparity between the two modes and causing a problem in that there is a sense that the four-wheel drive performance of the electric motor operating mode is inferior to that of the electric motor non-operating mode.

However, in conventional practice, the value estimated for the drive force applied to the main drive wheels is determined from the value estimated for the output torque of the engine and/or the electric motor estimated as described above irrespective of whether the hybrid four-wheel drive vehicle is in the electric motor operating mode or the electric motor non-operating mode, and this estimated main drive wheel drive force value is used as a basis to determine the command value for the distribution of drive force to the driven wheels, contributing to controlling the engaging capacity of the 4WD clutch. Therefore, the disparity in four-wheel drive performance between the two modes described above causes a drawback in that the same four-wheel drive performance cannot be achieved in both the electric motor operating mode and the electric motor non-operating mode.

To resolve this drawback, an object of the present invention is to provide a device for controlling the distribution of drive force in a four-wheel drive vehicle wherein the command value for the distribution of drive force to the driven wheels is upwardly corrected in the electric motor operating mode so as to be greater than the command value for the distribution of drive force to the driven wheels in the electric motor non-operating mode, and the same four-wheel drive performance can thereby be achieved if the conditions are the same in both the electric motor operating mode and the electric motor non-operating mode, whereby the above-described drawback can be resolved.

To achieve this object, the device for controlling the distribution of drive force in a four-wheel drive vehicle of the present invention is configured in the following manner.

First, the drive force distribution control device, which is the premise, shall be described. This device:

is used in a hybrid vehicle comprising an engine and an electric motor as motive power sources, and having as travel modes an electric motor operating mode in which the electric motor generates drive force, and an electric motor non-operating mode in which the electric motor does not generate drive force; and a drive force amount, which is part of the drive force sent from the motive power sources to main drive wheels and which is equivalent to a drive force distribution command value established according to an estimated value of drive force sent to the main drive wheels, is directed to driven wheels by four-wheel drive engaging means (device) of which the engaging capacity is controlled so that a drive force amount equivalent to the drive force distribution command value can be transmitted.

The present invention is characterized by a configuration in which the device for controlling the distribution of drive force in a four-wheel drive vehicle is provided with the following driven wheel drive force distribution reference command value calculation means (device) and driven wheel drive force distribution command value calculation means (device).

The first, the driven wheel drive force distribution reference command value calculation means (device), determines a driven-wheel-oriented drive force distribution reference command value from an estimated value of drive force sent to the main drive wheels and a driven-wheel-oriented drive force reference distribution ratio.

The second, the driven wheel drive force distribution command value calculation means (device), corrects the driven wheel drive force distribution reference command value by a correction amount for both the electric motor operating mode and the electric motor non-operating mode to determine the driven-wheel-oriented drive force distribution command value; and makes the correction amount for the electric motor operating mode greater than the correction amount for the electric motor non-operating mode.

In the drive force distribution control device of a four-wheel drive vehicle of the present invention described above, the correction amount used when the driven wheel drive force distribution reference command value is corrected to determine the command value for the driven-wheel-oriented distribution of drive force is made to differ between the electric motor operating mode and the electric motor non-operating mode, and the correction amount in the electric motor operating mode is made to be greater than the correction amount in the electric motor non-operating mode; therefore:

even if the estimated value of the engine output torque (the main drive wheel drive force) in the electric motor non-operating mode is raised by a safety margin to compensate for four-wheel drive performance because the estimation precision thereof is low, the same four-wheel drive performance can be achieved in the electric motor operating mode and the electric motor non-operating mode if conditions are the same.

Consequently, there is no longer a sense that the four-wheel drive performance of the electric motor operating mode is inferior to that of the electric motor non-operating mode, and the previously described conventional drawback can be resolved.

BRIEF DESCRIPTION OF THE DRAWINGS

Referring now to the attached drawings which form a part of this original disclosure.

DETAILED DESCRIPTION OF EMBODIMENTS

An embodiment of the invention is described below on the basis of the accompanying drawings.

Embodiment 1

Configuration

Figure 1:
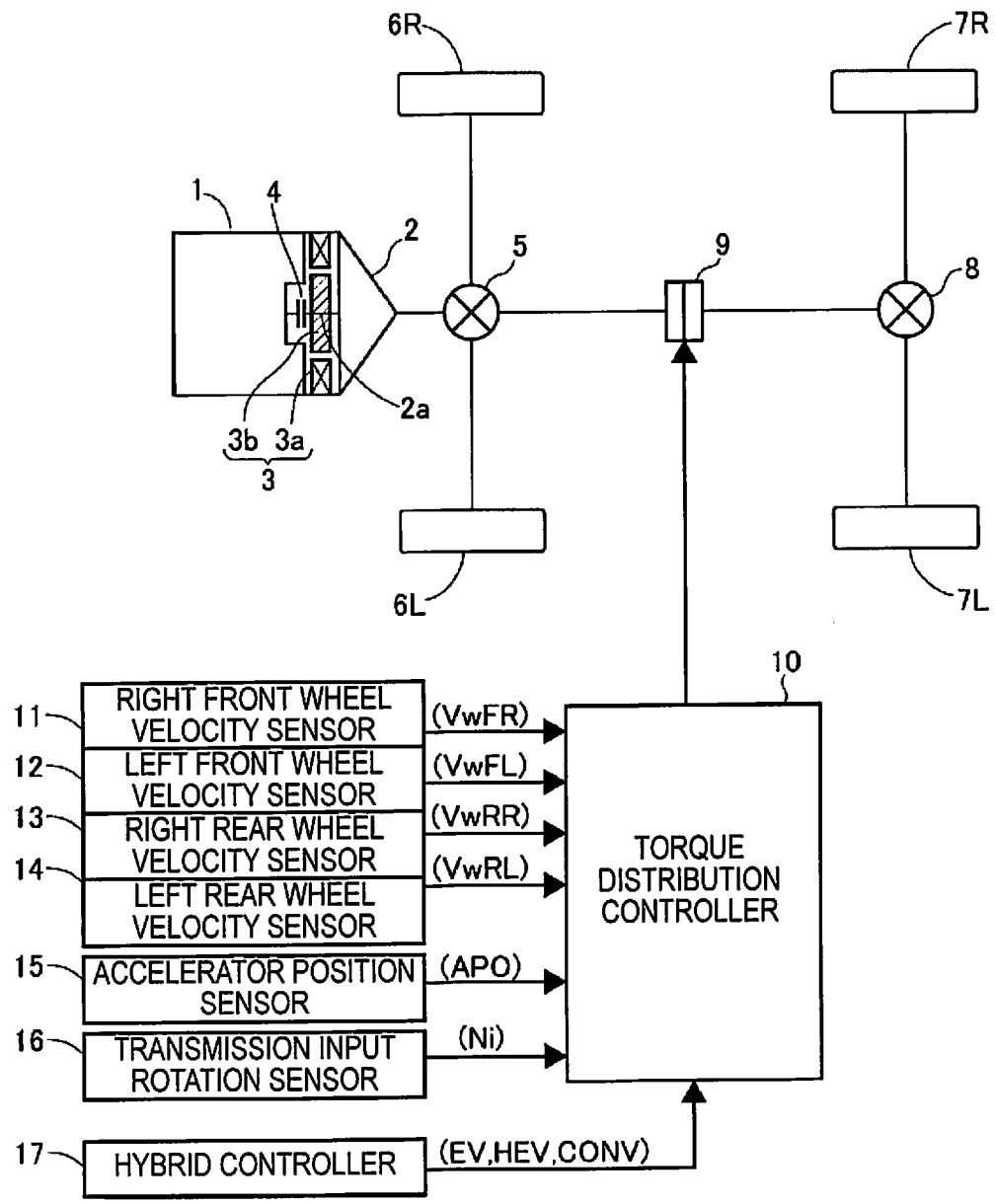
FIG. 1 is a schematic plan view of a power train of a hybrid four-wheel drive vehicle comprising a drive force distribution control device as an embodiment of the present invention, as seen from above the vehicle.

FIG. 1 is a schematic plan view of a power train of a hybrid four-wheel drive vehicle comprising a drive force distribution control device as an embodiment of the present invention, as seen from above the vehicle, where the symbol 1 denotes an engine as one motive power source, 2 denotes an automatic transmission, and an electric motor 3 as another motive power source is interposed between the engine 1 and the automatic transmission 2.

The electric motor 3 is formed from an annular stator 3a disposed in a fixed manner inside a motor housing, and a rotor 3b disposed concentrically inside the annular stator 3a with a radial gap in between, the rotor 3b being joined to a transmission input shaft 2a.

The transmission input shaft 2a is linked in a detachable manner to the engine 1 by a clutch 4.

An output shaft of the automatic transmission 2 is linked to left and right front wheels (main drive wheels) 6L, 6R via a front differential gear device 5.

The front differential gear device 5 and a rear differential gear device 8 between left and right rear wheels (driven wheels) 7L, 7R are capable of being drivably linked together as appropriate by a 4WD clutch (a four-wheel drive engaging means or device) 9 located therebetween.

When the clutch 4 is disengaged, only the drive force from the electric motor 3 is inputted to the automatic transmission 2 and the transmission output rotation after a gear shift is sent to the differential gear device 5, thereby enabling travel in an electric travel mode (EV mode) which relies only on the electric motor 3.

When the clutch 4 is engaged, the drive force from the engine 1 and the electric motor 3 is inputted to the automatic transmission 2, and the transmission output rotation after a gear shift is sent to the differential gear device 5 thereby enabling travel in a hybrid travel mode (HEV mode) which relies on the engine 1 and the electric motor 3.

If the electric motor 3 is not operating even though the clutch 4 is engaged, only the drive force from the engine 1 is inputted to the automatic transmission 2 and the transmission output rotation after a gear shift is sent to the differential gear device 5 thereby enabling travel in a conventional travel mode (CONV mode) which relies only on the engine 1.

The electric travel mode (EV mode) and the hybrid travel mode (HEV mode) are electric motor operating modes because the electric motor 3 is operated.

The conventional travel mode (CONV mode) is an electric motor non-operating mode because the electric motor 3 is not operated.

After a gear shift by the automatic transmission 2, the transmission output rotation reaches and drives the left and right front wheels (main drive wheels) 6L, 6R via the differential gear device 5, and if the 4WD clutch 9 is disengaged at this time, only the left and right front wheels 6L, 6R are driven, causing the vehicle to travel in two-wheel drive (2WD).

If the 4WD clutch 9 is engaged while the left and right front wheels (main drive wheels) 6L, 6R are being driven via the differential gear device 5, some of the torque (a torque amount corresponding to the engaging capacity of the 4WD clutch 9) sent from the differential gear device 5 to the left and right front wheels (main drive wheels) 6L, 6R is sent to the differential gear device 8, the left and right rear wheels (driven wheels) 7L, 7R are driven as well, and the vehicle can be made to travel in four-wheel drive (4WD).

Drive Force Distribution Control

Disengaging and engaging capacity control of the 4WD clutch 9 are executed by a torque distribution controller 10.

Therefore, a signal from a right front wheel velocity sensor 11 for detecting the vehicle wheel circumferential velocity VwFR of the right front wheel 6R, a signal from a left front wheel velocity sensor 12 for detecting the vehicle wheel circumferential velocity VwFL of the left front wheel 6L, a signal from a right rear wheel velocity sensor 13 for detecting the vehicle wheel circumferential velocity VwRR of the right rear wheel 7R, a signal from a left rear wheel velocity sensor 14 for detecting the vehicle wheel circumferential velocity VwRL of the left rear wheel 7L, a signal from an accelerator position sensor 15 for detecting an accelerator position APO, a signal from a transmission input rotation sensor 16 for detecting transmission input rotation Ni, and a signal from a hybrid controller 17 responsible for selection control of the travel modes (EV mode, HEV mode, CONV mode) are inputted to the torque distribution controller 10.

Figure 2:
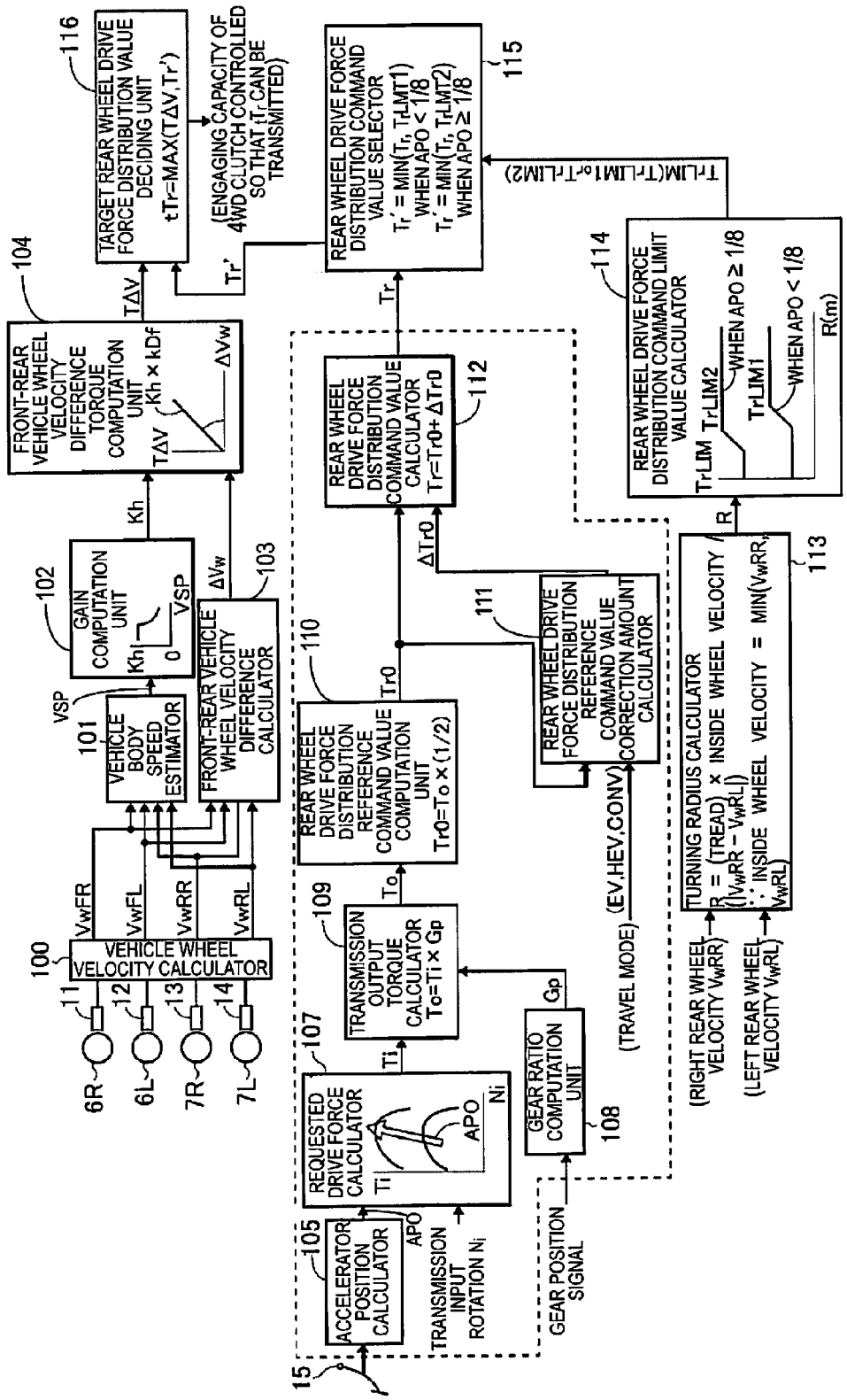
FIG. 2 is a functional block diagram of the torque distribution controller in FIG. 1.

The torque distribution controller 10, which is shown in FIG. 2 as a functional block diagram, performs the following calculations on the basis of the various input information described above and executes disengaging and engaging capacity control (four-wheel drive control) of the 4WD clutch 9.

In a vehicle wheel velocity calculator 100 of FIG. 2, the right front wheel velocity VwFR, the left front wheel velocity VwFL, the right rear wheel velocity VwRR, and the left rear wheel velocity VwRL are calculated on the basis of the signals from the vehicle wheel velocity sensors 11 to 14.

In a vehicle body speed estimator 101, the vehicle body speed (vehicle speed) VSP is estimated by calculations similar to those performed in anti-skid control and the like, on the basis of the right front wheel velocity VwFR, the left front wheel velocity VwFL, the right rear wheel velocity VwRR, and the left rear wheel velocity VwRL.

In a gain computation unit 102, a pre-established gain map is used to determine the gain Kh from the estimated vehicle body speed VSP described above.

In a front-rear vehicle wheel velocity difference calculator 103, a front-rear vehicle wheel velocity difference $\Delta Vw = VwF - VwR$ is calculated from the average value (left-right front wheel velocity average value) VwF of the left and right front wheel velocities VwFL, VwFr and the average value (left-right rear wheel velocity average value) VwR of the left and right rear wheel velocities VwRL, VwRr.

In a front-rear vehicle wheel velocity difference torque computation unit 104, the product (Kh×KDf) of the gain KDf obtained from the left-right front wheel velocity difference $\Delta$VwF and the gain Kh determined by the gain computation unit 102 is designated as the total gain, and this total gain is used as a basis to determine a front-rear vehicle wheel velocity difference torque T$\Delta$V corresponding to the front-rear vehicle wheel velocity difference $\Delta$Vw.

In an accelerator position calculator 105, the accelerator position APO is calculated on the basis of the signal from the accelerator position sensor 15.

In a requested drive force (torque) calculator 107, a requested drive force Ti on the transmission input shaft 2a is determined from the accelerator position APO and the transmission input rotation Ni on the basis of a pre-established torque map.

In a gear ratio computation unit 108, a gear ratio Gp is determined from a gear position signal of the automatic transmission 2.

In a transmission output torque calculator 109, the requested drive force Ti on the transmission input shaft 2a and the gear ratio Gp of the automatic transmission 2 are used to determine the transmission output torque To sent to the left and right front wheels 6L, 6R, which are the main drive wheels, through the calculation To=Ti×Gp.

In a rear wheel drive force distribution reference command value computation unit 110, a rear wheel drive force distribution reference command value Tr0 is determined as a reference that will be directed to the left and right rear wheels 7L, 7R when the vehicle goes into 4WD travel.

Therefore, the rear wheel drive force distribution reference command value computation unit 110 is equivalent to the driven wheel drive force distribution reference command value calculation means (device) in the present invention.

In the present embodiment, a front-rear wheel equal torque distribution for equally distributing torque to the front and rear wheels is used as a reference, and the rear wheel drive force distribution reference command value Tr0 is therefore half of the transmission output torque To and is determined by the calculation Tr0=To×(½).

Figure 3:
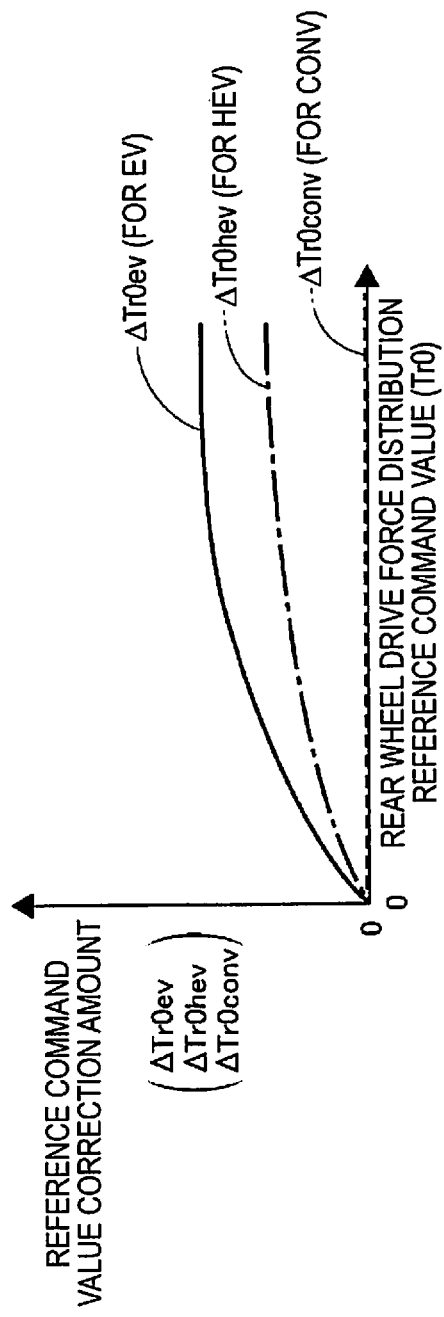
FIG. 3 is a diagram of the changing characteristics of the rear wheel drive force distribution reference command value correction amount for each travel mode used when calculating the rear wheel drive force distribution command value in FIG. 2.

In a rear wheel drive force distribution reference command value correction amount calculator 111, a rear wheel drive force distribution reference command value correction amount $\Delta$Tr0 is determined from the rear wheel drive force distribution reference command value Tr0 on the basis of a pre-established map of each travel mode (EV mode, HEV mode, CONV mode) shown in FIG. 3.

When the rear wheel drive force distribution reference command value correction amount $\Delta$Tr0 is determined by this calculator 111, the rear wheel drive force distribution reference command value correction amount $\Delta$Tr0 is determined in the following manner depending on whether the travel mode is EV mode, HEV mode, or CONV mode.

Specifically, if the travel mode is EV mode, an EV correction amount $\Delta$Tr0ev is determined from the rear wheel drive force distribution reference command value Tr0 on the basis of the corresponding EV map of FIG. 3, and this amount is established as the rear wheel drive force distribution reference command value correction amount $\Delta$Tr0.

If the travel mode is HEV mode, an HEV correction amount $\Delta$Tr0hev is determined from the rear wheel drive force distribution reference command value Tr0 on the basis of the corresponding HEV map of FIG. 3, and this amount is established as the rear wheel drive force distribution reference command value correction amount $\Delta$Tr0.

Furthermore, if the travel mode is CONV mode, a CONV correction amount $\Delta$Tr0conv is determined from the rear wheel drive force distribution reference command value Tr0 on the basis of the corresponding CONV map of FIG. 3, and this amount is established as the rear wheel drive force distribution reference command value correction amount $\Delta$Tr0.

The EV correction amount $\Delta$Tr0ev, the HEV correction amount $\Delta$Tr0hev, and the CONV correction amount $\Delta$Tr0conv have the magnitude relationship $\Delta$Tr0ev>$\Delta$Tr0hev>$\Delta$Tr0conv as shown in FIG. 3, whereby the rear wheel drive force distribution reference command value correction amount $\Delta$Tr0 is greatest in EV mode which relies only on the electric motor 3, smallest at 0 in CONV mode which relies only on the engine 1, and is a correction amount between these two in HEV mode which relies on both the engine 1 and the electric motor 3.

In a rear wheel drive force distribution command value calculator 112, the rear wheel drive force distribution reference command value correction amount $\Delta$Tr0 is added to the rear wheel drive force distribution reference command value Tr0 to determine a rear wheel drive force distribution command value Tr (=Tr0+$\Delta$Tr0).

Therefore, the rear wheel drive force distribution command value calculator 112 and the rear wheel drive force distribution reference command value correction amount calculator 111 together constitute the driven wheel drive force distribution command value calculation means or device in the present invention.

Figure 4:
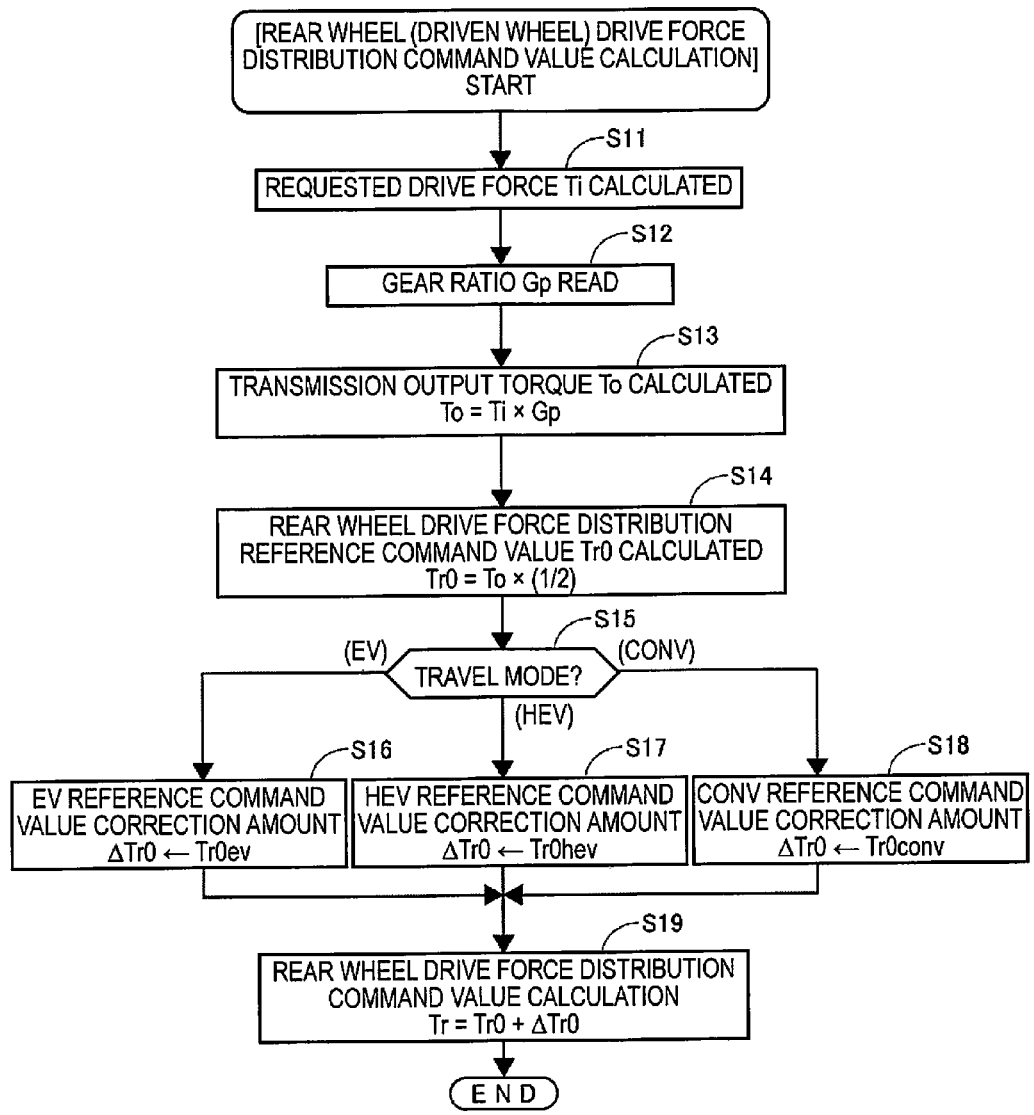
FIG. 4 is a flowchart of the control program of the block portion for calculating the rear wheel drive force distribution command value in FIG. 2.

The area enclosed by the dashed lines in FIG. 2, where the block group 105 to 112 determines the rear wheel drive force distribution command value Tr, is shown by a flowchart in FIG. 4.

In step S11 of FIG. 4, the requested drive force Ti on the transmission input shaft 2a is determined from the accelerator position APO and the transmission input rotation Ni on the basis of the pre-established torque map, as was previously described for the calculator 107 of FIG. 2.

In step S12, the gear ratio Gp is determined and read from the gear position signal of the automatic transmission 2, as was previously described for the calculator 108 of FIG. 2.

In step S13, the transmission output torque To sent to the left and right front wheels (main drive wheels) 6L, 6R is determined from the requested drive force Ti on the transmission input shaft 2a and the gear ratio Gp of the automatic transmission 2 through the calculation To=Ti×Gp, as was previously described for the calculator 109 of FIG. 2.

In step S14, the rear wheel drive force distribution reference command value Tr0, which is a reference to be directed to the left and right rear wheels 7L, 7R when the vehicle goes into 4WD travel, is determined through the calculation Tr0=To×(½), as was previously described for the computation unit 110.

Step S15 checks whether the travel mode is EV mode, HEV mode, or CONV mode.

In step S16 if EV mode, step S17 if HEV mode, or step S18 if CONV mode, the EV correction amount ΔTr0ev, the HEV correction amount ΔTr0hev, or the CONV correction amount ΔTr0conv is determined from the rear wheel drive force distribution reference command value Tr0 on the basis of the corresponding EV map, HEV map, or CONV map of FIG. 3, as was previously described for the calculator 111 of FIG. 2. The correction amount thus determined is established as the rear wheel drive force distribution reference command value correction amount ΔTr0.

In step S19, which is selected after the rear wheel drive force distribution reference command value correction amount ΔTr0 has been established as described above in step S16, step S17, or step S18, the rear wheel drive force distribution command value Tr is determined through the calculation Tr=Tr0+ΔTr0, as was previously described for the calculator 112 of FIG. 2.

In a turning radius calculator 113 of FIG. 2, the turning radius Rwo of the vehicle is determined through the following formula from the left and right rear wheel velocities VwRL, VwRR, the tread between the left and right rear wheels 7L, 7R, and the vehicle wheel velocity of the whichever of the left and right rear wheels 7L, 7R is on the inside of the turn (the inside wheel velocity), i.e. the smaller of the VwRL and the VwRR {MIN(VwRL, VwRR)}.

R=(tread)×inside wheel velocity/(|VwRL−VwRR|)

In a rear wheel drive force distribution command limit value calculator 114, a rear wheel drive force distribution command limit value TrLMT corresponding to the turning radius R is determined in the following manner.

When this rear wheel drive force distribution command limit value TrLMT is determined, it is determined according to whether the accelerator position APO is less than ⅛, or equal to or greater than ⅛. If APO<⅛, a small TrLMT1 for avoiding tight corner braking is established as the rear wheel drive force distribution command limit value TrLMT, and if APO>⅛, a large TrLMT2 for guaranteeing four-wheel drive performance is established as the rear wheel drive force distribution command limit value TrLMT.

In a rear wheel drive force distribution command value selector 115, depending on whether the accelerator position APO is less than ⅛ or equal to or greater than ⅛, whichever is smaller between the rear wheel drive force distribution command value Tr from the calculator 112 and the small TrLMT1 from the calculator 114 (MIN(Tr, TrLMT1)) is selected and established as the rear wheel drive force distribution command value Tr' if APO<⅛, and if APO>⅛, whichever is smaller between the rear wheel drive force distribution command value Tr from the calculator 112 and the large TrLMT2 from the calculator 114 (MIN(Tr, TrLMT2)) is selected and established as the rear wheel drive force distribution command value Tr'.

In a target rear wheel drive force distribution value deciding unit 116, whichever is greater between the front-rear vehicle wheel velocity difference torque TiV from the computation unit 104 and the rear wheel drive force distribution command value Tr' from the selector 115 (MAX (TΔV, Tr')) is selected and established as a target rear wheel drive force distribution value tTr.

The torque distribution controller 10 of FIG. 1 controls the engaging capacity of the 4WD clutch 9 so that the final target rear wheel drive force distribution value tTr determined as described above can be transmitted.

Due to this engaging capacity control of the 4WD clutch 9, a torque amount that is part of the torque sent from the automatic transmission 2 to the left and right front wheels 6L, 6R and that corresponds to the engaging capacity of the 4WD clutch 9 is transmitted to the left and right rear wheels 7L, 7R, and a predetermined four-wheel drive performance can be exhibited.

Results

According to the configuration of the present embodiment described above, the correction amount ΔTr0, which is used when the rear wheel drive force distribution reference command value Tr0 is corrected to determine the rear wheel drive force distribution command value Tr, is made to differ between an electric motor operating mode such as EV mode or HEV mode and an electric motor non-operating mode such as CONV mode as shown in FIG. 3, and the correction amount in the electric motor operating mode is made to be greater than the correction amount in the electric motor non-operating mode; therefore:

even if the estimated value of the engine output torque (the main drive wheel drive force) in the electric motor non-operating mode is raised by a safety margin to compensate for four-wheel drive performance because the estimation precision thereof is low, the same four-wheel drive performance can be achieved in the electric motor operating mode and the electric motor non-operating mode if conditions are the same.

Consequently, there is no longer a sense that the four-wheel drive performance of the electric motor operating mode is inferior to that of the electric motor non-operating mode.

Other Embodiments

When the correction amounts ΔTr0ev, ΔTr0hev, and ΔTr0conv of each travel mode shown in FIG. 3 are set, the correction amounts ΔTr0ev, ΔTr0hev, and ΔTr0conv of each travel mode may be set so that a higher estimated value of the transmission output torque To sent to the left and right front wheels (main drive wheels) 6L, 6R corresponds to a greater difference in the rear wheel (driven wheel) drive force distribution command value Tr between the electric motor operating mode and the electric motor non-operating mode.

In this embodiment, in a moderate area of the transmission output torque To in which the output distribution ratio of the electric motor 3 is high in the electric motor operating mode, the 4WD extent can be strengthened to adapt to the actual transmission output which is likely to be higher than in the electric motor non-operating mode, i.e. to adapt to a high rear wheel drive force ratio relative to the transmission output torque To, and the desired 4WD performance can be achieved.

When the correction amounts ΔTr0ev, ΔTr0hev, and ΔTr0conv of each travel mode shown in FIG. 3 are set, until the estimated value of the transmission output torque To sent to the left and right front wheels (main drive wheels) 6L, 6R increases to a predetermined value, the correction amounts ΔTr0ev, ETr0hev, and ΔTr0conv of each travel mode may be set so that a higher estimated value corresponds to a greater difference in the rear wheel (driven wheel) drive force distribution command value Tr between the electric motor operating mode and the electric motor non-operating mode; and when the estimated value of the transmission output torque To sent to the left and right front wheels (main drive wheels) 6L, 6R exceeds the predetermined value, the correction amounts ΔTr0ev, ΔTr0hev, and ΔTr0conv of each travel mode may be set so that a higher estimated value corresponds to a lesser difference in the rear wheel (driven wheel) drive force distribution command value Tr is between the electric motor operating mode and the electric motor non-operating mode.

In this embodiment, in an area (approaching CONV mode) in which the estimated value of the transmission output torque To sent to the left and right front wheels (main drive wheels) 6L, 6R increases, the output distribution ratio of the electric motor 3 decreases, and the ratio of distribution of the output of the engine 1 proportionately increases, the rear wheel (driven wheel) drive force distribution command value Tr approaches the command value of CONV mode, and the desired 4WD performance can be achieved.

To achieve these operational effects, as shall be apparent, the aforementioned predetermined value should be set to a transmission output torque To at which the output distribution ratio of the electric motor 3 reaches a maximum.

The invention claimed is:

1. a device for controlling a distribution of drive force in a hybrid four-wheel drive vehicle, the device for the hybrid vehicle including an engine and an electric motor as motive power sources and having as travel modes an electric motor operating mode in which the electric motor generates drive force and either only a drive force of the electric motor is directed to drive wheels or the drive force of the electric motor and drive force generated by the engine are both directed to the drive wheels, and an electric motor non-operating mode in which the electric motor does not generate drive force and only a drive force generated by the engine is directed to the drive wheels, a drive force amount, which is part of the drive force sent from the motive power sources to drive wheels, and which is equivalent to a drive force distribution command value established according to an estimated value of the drive force sent to the drive wheels, is directed to driven wheels by a four-wheel drive engaging device of which an engaging capacity is controlled so that the drive force amount equivalent to the drive force distribution command value can be transmitted, and in the electric motor non- operating mode, the drive force amount equivalent to the drive force distribution command value is increased by a safety margin to compensate for four-wheel drive performance, the device for controlling the distribution of drive force comprising:

a driven wheel drive force distribution reference command value calculator configured to determine a driven-wheel-oriented drive force distribution reference command value from the estimated value of the drive force sent to the drive wheels and a drive force reference distribution ratio; and a driven wheel drive force distribution command value calculator configured to determine a driven-wheel-oriented drive force distribution command value by correcting the driven wheel drive force distribution reference command value by a correction amount that differs between the electric motor operating mode and the electric motor non-operating mode, and to make the correction amount for the electric motor operating mode greater than the correction amount for the electric motor non-operating mode.

2. The device for controlling the distribution of drive force in the hybrid four-wheel drive vehicle according to claim 1, wherein the driven wheel drive force distribution command value calculator is configured to determine the correction amount for each of the electric motor operating mode and the electric motor non-operating mode so that a higher estimated value of drive force sent to the drive wheels corresponds to a greater difference in the driven wheel drive force distribution command value between the electric motor operating mode and the electric motor non-operating mode.

3. The device for controlling the distribution of drive force in the hybrid four-wheel drive vehicle according to claim 1, wherein the driven wheel drive force distribution command value calculator is configured to determine the correction amount for each of the electric motor operating mode and the electric motor non-operating mode so that the higher estimated value corresponds to the greater difference in the driven wheel rive force distribution command value between the electric motor operating mode and the electric motor non-operating mode until the estimated value of drive force sent to the drive wheels increases to a predetermined value, and when the estimated value of drive force sent to the rive wheels exceeds the predetermined value, the driven wheel drive force distribution command value calculator is configured to determine the correction amount for each of the electric motor operating mode and the electric motor non-operating mode so that the higher estimated value corresponds to a lesser difference in the driven wheel drive force distribution command value between the electric motor operating mode and the electric motor non-operating mode.

4. The device for controlling the distribution of drive force in the hybrid four-wheel drive vehicle according to claim 2, wherein the driven wheel drive force distribution command value calculator is configured to determine the correction amount for each of the electric motor operating mode and the electric motor non-operating mode so that the higher estimated value corresponds to the greater difference in the driven wheel drive force distribution command value between the electric motor operating mode and the electric motor non-operating mode until the estimated value of drive force sent to the drive wheels increases to a predetermined value, and when the estimated value of drive force sent to the drive wheels exceeds the predetermined value, the driven wheel drive force distribution command value calculator is configured to determine the correction amount for each of the electric motor operating mode and the electric motor non-operating mode so that the higher estimated value corresponds to a lesser difference in the driven wheel drive force distribution command value between the electric motor operating mode and the electric motor non-operating mode.

* * * * *